April 6, 1926.

A. E. CUTLER ET AL 1,580,020

ELECTRIC WELDING APPARATUS

Filed July 24, 1923

Inventors
Arthur Edward Cutler
and Philip Allan Marsden
By
B. Singer Atty.

April 6, 1926.
A. E. CUTLER ET AL
1,580,020
ELECTRIC WELDING APPARATUS
Filed July 24, 1923
10 Sheets-Sheet 2
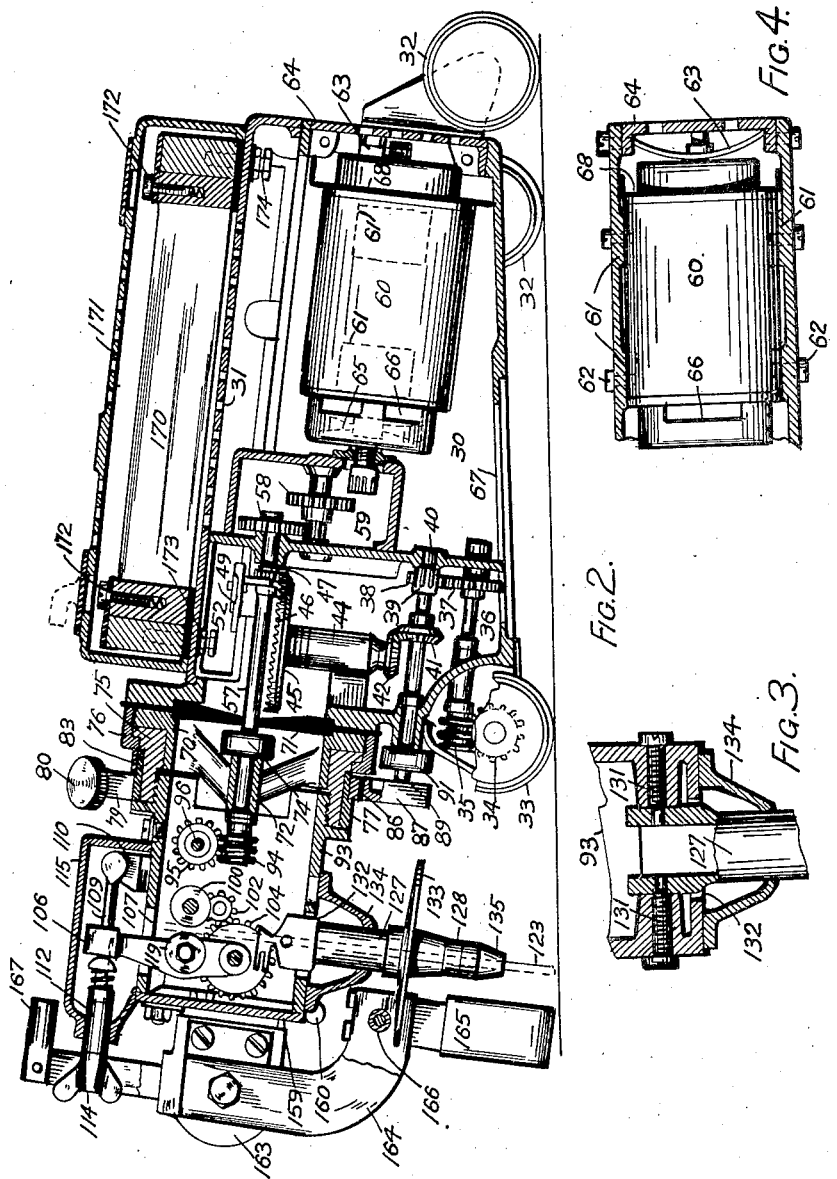
Inventors
Arthur Edward Cutler
and Philip Allen Marsden
by B Singer Atty April 6, 1926.
A. E. CUTLER ET AL
ELECTRIC WELDING APPARATUS
Filed July 24, 1923     10 Sheets-Sheet 3
1,580,020
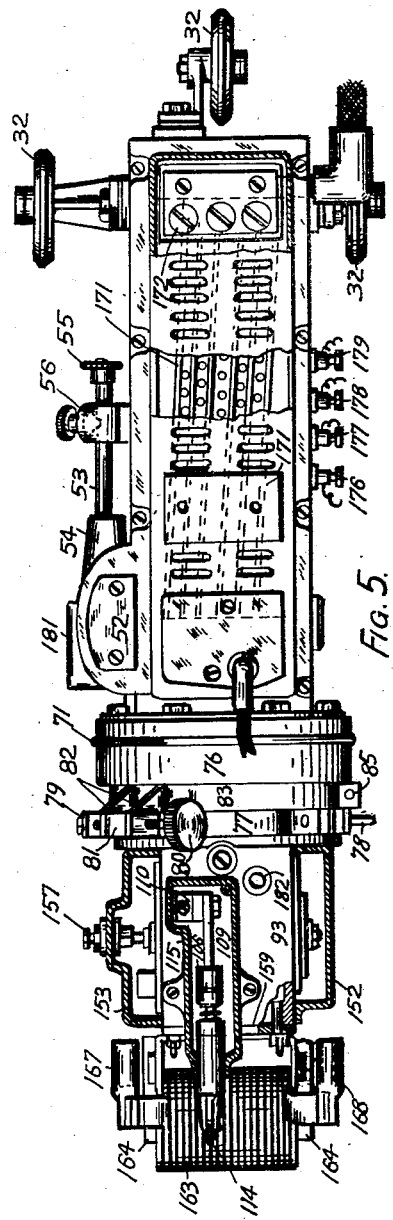
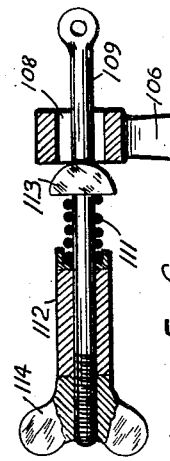
Inventors
Arthur Edward Cutler
and Philip Allen Marsden
by B. Singer Atty April 6, 1926.

A. E. CUTLER ET AL 1,580,020

ELECTRIC WELDING APPARATUS

Filed July 24, 1923

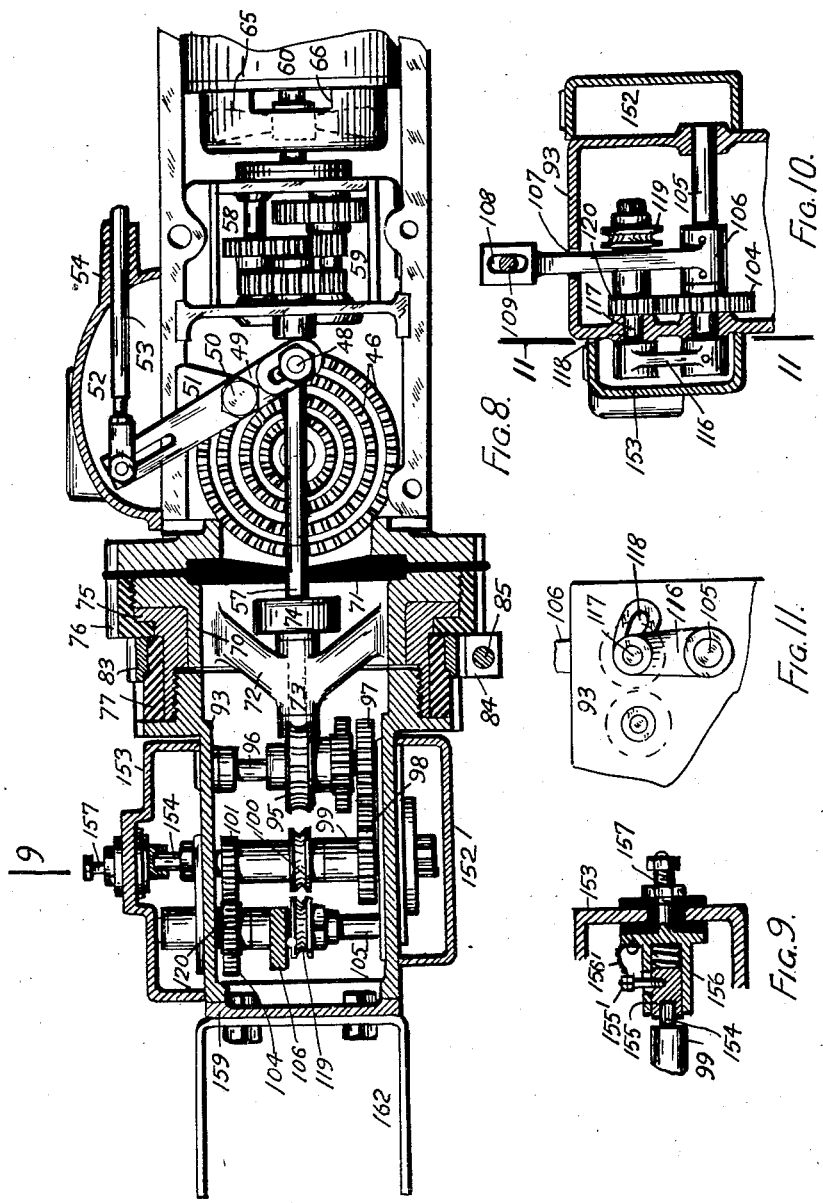

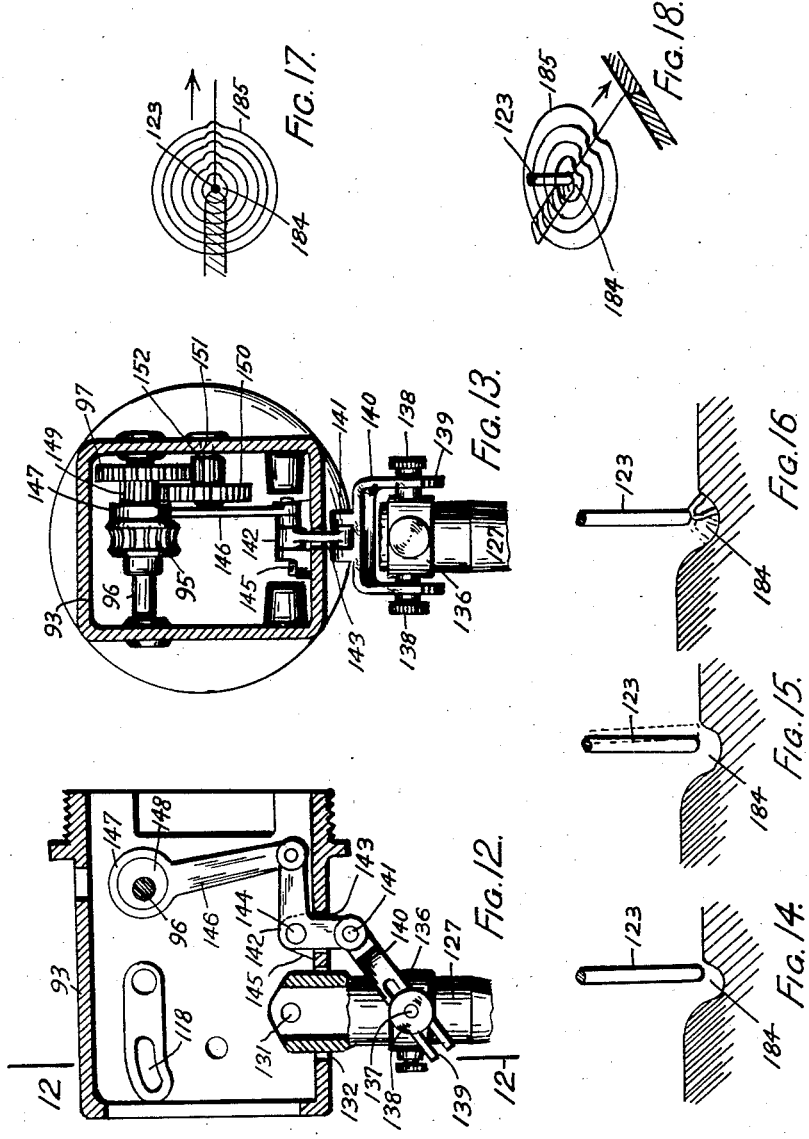

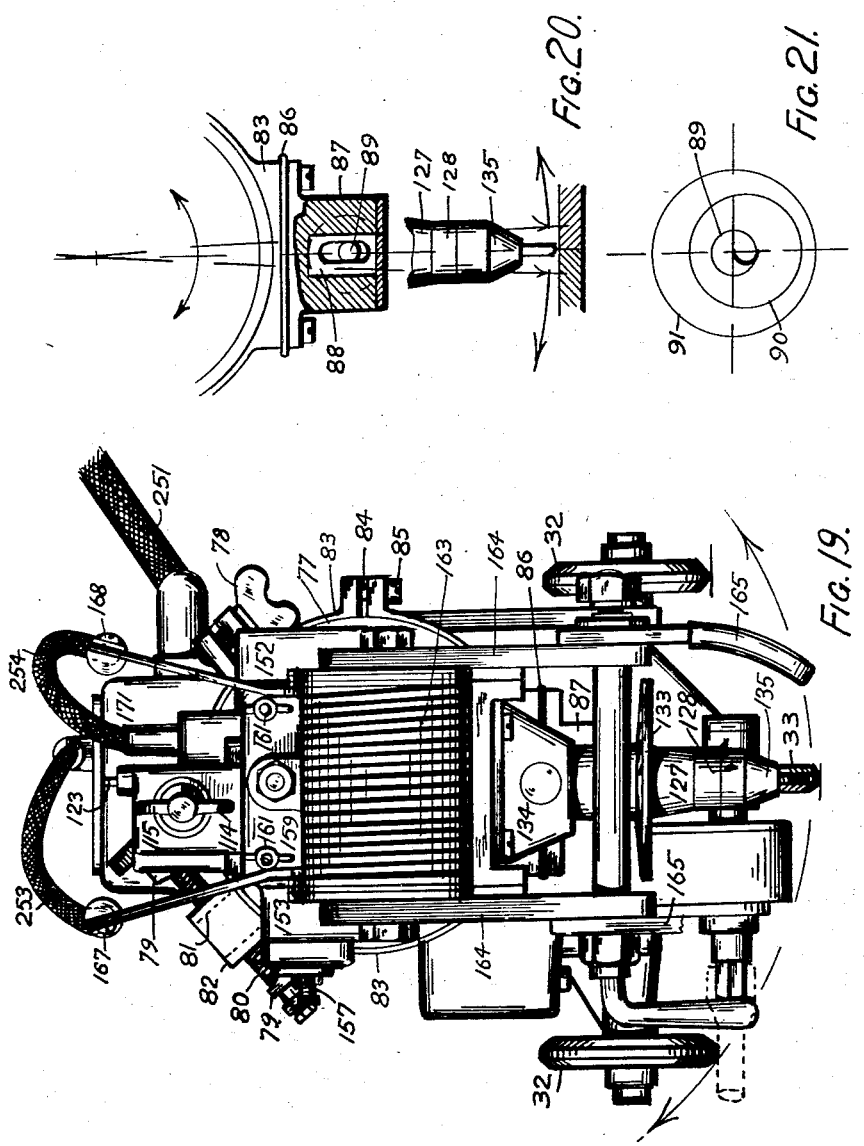

April 6, 1926.
A. E. CUTLER ET AL
1,580,020
ELECTRIC WELDING APPARATUS
Filed July 24, 1923
10 Sheets-Sheet 8
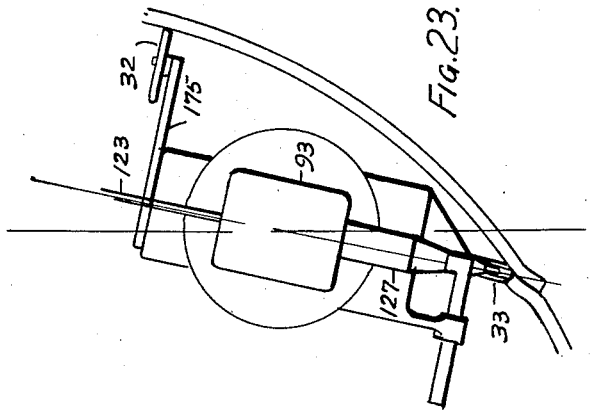
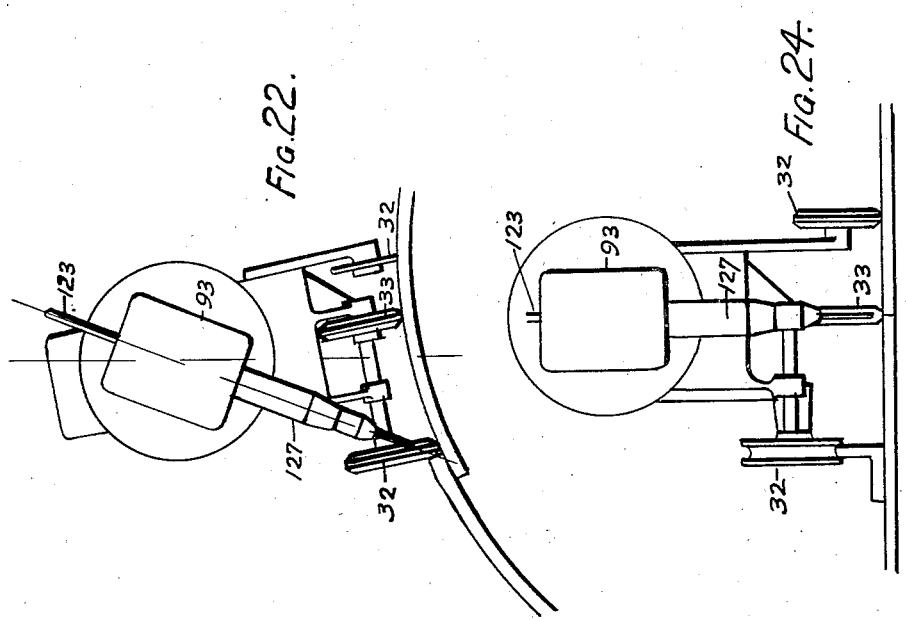
Inventors
Arthur Edward Cutler
Philip Allan Marsden
by B. Singer Atty

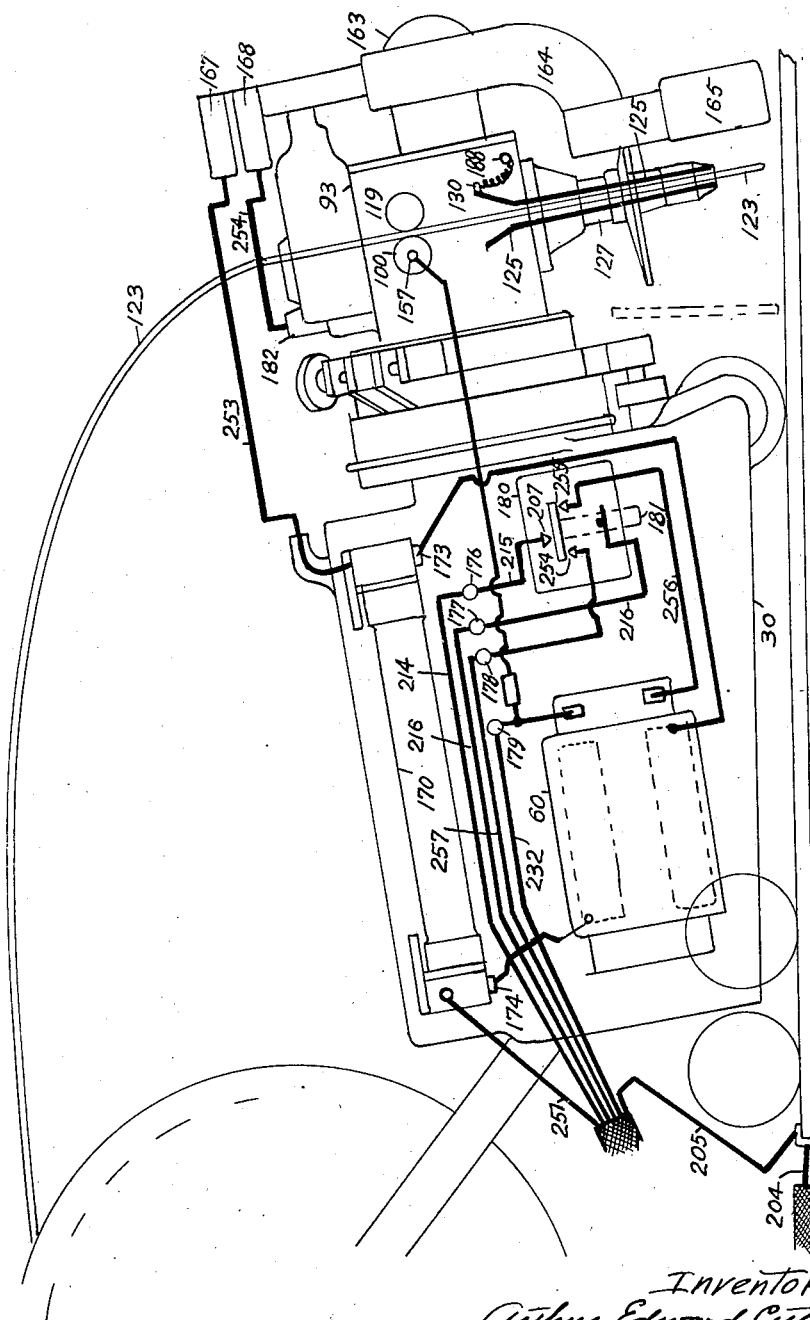

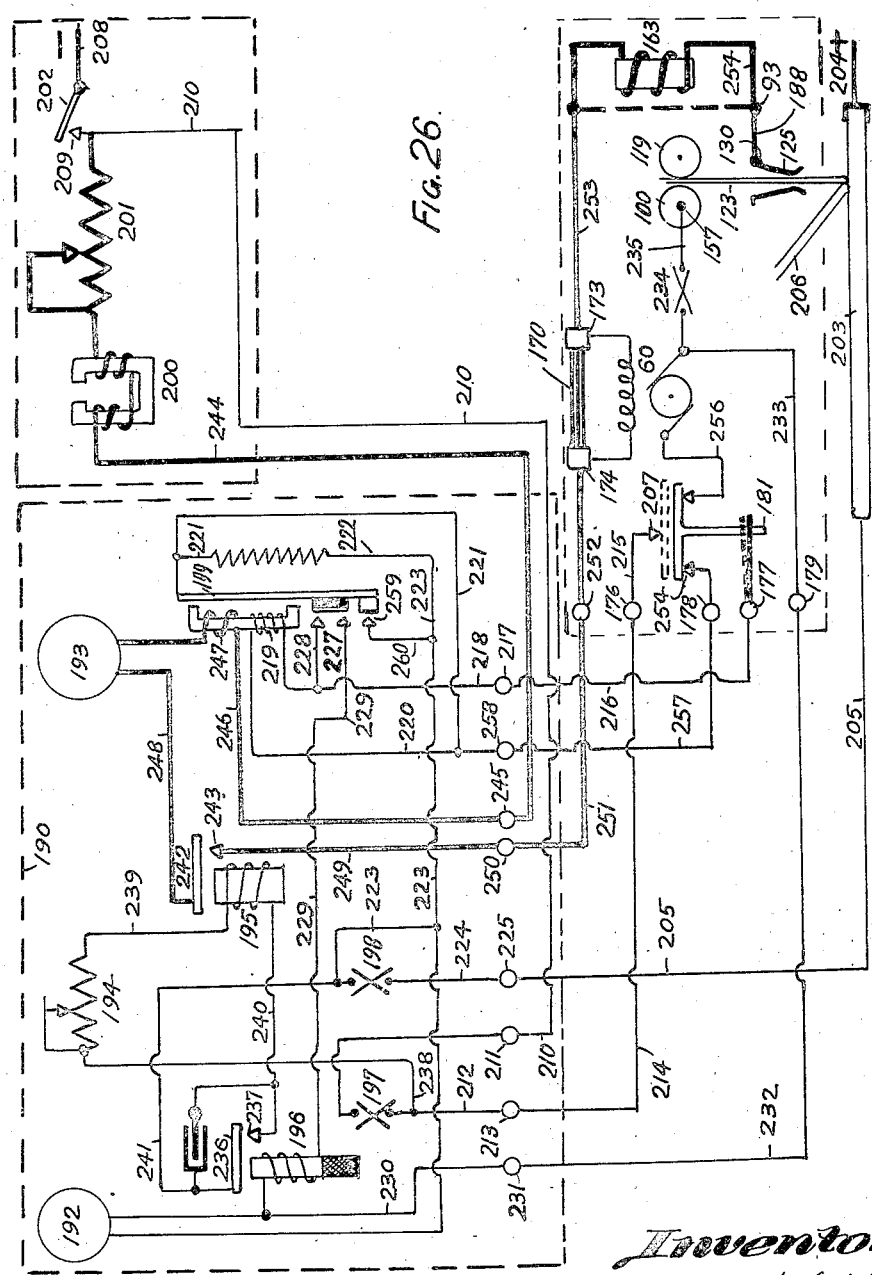

Patented Apr. 6, 1926.

1,580,020

UNITED STATES PATENT OFFICE.

ARTHUR EDWARD CUTLER AND PHILIP ALLAN MARSDEN, OF NEWCASTLE, NEW SOUTH WALES, AUSTRALIA.

ELECTRIC WELDING APPARATUS.

Application filed July 24, 1923. Serial No. 653,589.

*To all whom it may concern:*

Be it known that we, ARTHUR EDWARD CUTLER and PHILIP ALLAN MARSDEN, subjects of the King of Great Britain and Ireland, and residents of Newcastle, in the State of New South Wales, Commonwealth of Australia, have invented certain new and useful Improvements in Electric Welding Apparatus (for which we have filed applications in Australia, No. 8,496, filed 18th August, 1922; New Zealand, No. 48,745, filed 30th August, 1922; Great Britain, No. 26,818, filed 4th October, 1922; South Africa, No. 860/22, filed 11th September, 1922), of which the following is a specification.

This invention relates to apparatus for the production of electric arc welds of various types; and the object of the invention is to provide apparatus which by the automatic maintenance of practically constant length of arc and automatic regulation of speed of travel will result in economy of electrical energy, greatly increased speed, superior quality of welds as regards strength, solidity, ductility and uniformity, relief of strain on the operator and the effective production of certain types of welds which are not capable of production by hand welding. A further object of the invention is to provide apparatus particularly adapted for the production of long straight welds such as are necessary in the manufacture of welded pipes, a feature of the apparatus being that it is adapted for welding on the inside as well as on the outside of pipes and the like. A further feature of the invention is that highly skilled labour is unnecessary.

The invention comprises an electrically operated machine and electrical equipment or lay-out, the nature of both being hereinafter described.

The apparatus is suitable for welding with A. C. or D. C. current, and an electrode of any suitable material may be employed; ordinary steel wire is found very suitable for use in welding mild steel.

The machine comprises a frame or housing supported on wheels which are adjustable in known manner to suit the nature of the work to be operated upon; and one of said wheels constitutes a driving wheel whereby the machine is progressed along the work as required.

At one end of the housing is a substantially cylindrical head which is rotatable about its axis and can be fixed in any approximate angular position, by clamping screws, and finally adjusted or manipulated during the progress of the work by means of tangential screws or other suitable means. From the underside of the head projects a nozzle through which is fed the electrode passed through the head from a drum located in a convenient and suitable position on the housing or elsewhere, said electrode being gripped within the head between a pair of grooved and serrated feed rollers which are geared together, adjustment of the grip being effected by a tension screw arrangement. Said feed rollers are made in pairs, and in a sufficient range of diameters to suit any desired current and diameter of electrode, provision being made for the easy interchange of said pairs.

Within the housing is an electric motor which through reduction gearing drives a second motion shaft; the latter, in addition to its other function as hereinafter described, constitutes the axis about which the head is angularly turned as before mentioned.

The feed rollers are driven from this second motion shaft through suitable reduction gearing such as worm and spur gearing; and from the same shaft the before mentioned driving wheel or wheels are driven through variable speed gear.

In order to insure that the arc will cover the adjoining parts to be welded together, the nozzle together with the head can be oscillated about the axis of the head in a direction transverse to the line of weld. The amount of this motion can be varied by an adjustable crank pin, working in a slotted arm affixed to the head. In addition to this motion the nozzle can be oscillated in the direction of the line of weld by means of an eccentric and adjustable link connections.

It has been found that on certain classes of welds the arc is deflected from its correct position and the electrode has a tendency to freeze on to the work. To correct this action, a suitable magnet is incorporated with the machine so as to cause the arc to play in the correct way.

The arrangement of the electrical equipment is such that an exceedingly steady arc, as regards voltage, current and length of arc is automatically maintained, while the rate of advancement of the electrode and propulsion of the machine are dependent upon and are also automatically controlled by the condition prevailing at the welding arc.

In carrying this part of our invention into effect, the main welding current is tapped to provide the motive power for the electric motor installed in the housing of the machine, and which, through the gearing hereinbefore referred to, feeds the electrode and propels the machine. The welding circuit is closed by the welding arc and therefore the conditions prevailing at the welding arc govern the energy imparted to the armature and field windings of the motor. Should the arc lengthen an increased voltage results at this point causing a reduction in the welding current. This increased voltage being applied to the armature in conjunction with a weakened field caused by the reduced welding current causes the motor to be accelerated, while the reverse occurs if the arc shortens. Should the arc fail automatic magnetic switches cut off the supply of current.

In order that the invention may be clearly understood we will now refer to the accompanying drawings in which:

Fig. 1 is a perspective view of the machine.

Fig. 2 a longitudinal sectional elevation thereof, and

Fig. 3 a sectional detail view of the nozzle pivoted to the head of the machine.

Fig. 4 is a detail view of the manner in which the motor is fixed on the machine.

Fig. 5 is a sectional plan of the machine, and

Fig. 6 a detail view of the feed roller tensioning screw.

Figure 7:
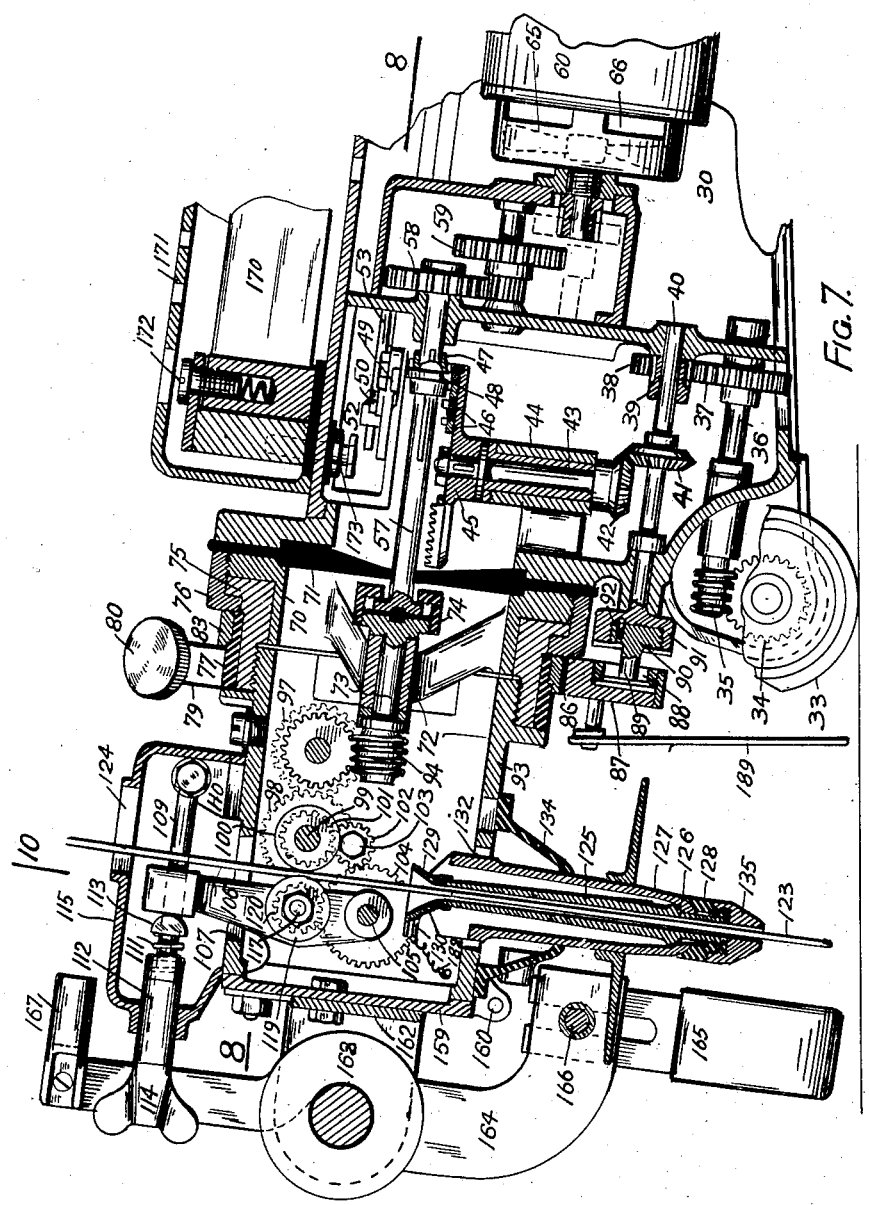

Fig. 7 is a longitudinal central sectional elevation (to a larger scale) through the welding head and part of the main housing, Fig. 8 a sectional plan on line 8—8 of Fig. 7, and Fig. 9 a partial cross sectional elevation on line 9—9 of Fig. 8.

Fig. 10 is a sectional elevation on line 10—10 of Fig. 7.

Fig. 11 is an elevation view on line 11—11 of Fig. 10.

Fig. 12 is a sectional elevation showing in detail the oscillating mechanism for the nozzle, and Fig. 13 a cross sectional elevation on line 13—13 of Fig. 12.

Figs. 14, 15, and 16 are diagrammatic views illustrating the effect of the arc during welding.

Figs. 17 and 18 are views illustrating the effect of the magnetic reluctance during welding.

Fig. 19 is an end elevation of the head end of the machine.

Fig. 20, a sectional detail view of the crank pin oscillating the head of the mechanism, and Fig. 21, a detail view of the adjustable crank pin.

Figs. 22 and 23 are diagrammatic views illustrating how the machine is applied to welding pipes exteriorly and interiorly respectively, and Fig. 24 a similar view on flat surfaces.

Fig. 25 is a diagrammatic view of the electric circuits embodied in the machine, and Fig. 26 a diagrammatic view of the whole electrical layout of the apparatus.

The main housing 30 has a perforated cover 31 and is mounted upon adjustable wheels 32. In addition thereto is the driving wheel 33 driven by worm wheel 34 and worm 35, the latter being mounted upon a shaft 36 on which is gear wheel 37 meshing with gear wheel 38 which meshes with a pinion 39 on the shaft 40. This shaft 40 receives its motion through the bevel gears 41 and 42, the latter of which is affixed to a vertical shaft 43 in bearing bracket 44. The upper end of this vertical shaft 43 supports a disc 45 having thereon a plurality of concentric toothed crown wheels 46 (see Fig. 8), with any one of which a slidable pinion wheel 47 may be caused to gear, said pinion 47 being moved into selected engagement by means of a fork 48 on the end of change speed lever 49, said lever being fulcrumed at 50 to a bracket 51. This lever has its outer end protruding into a dust cover 52, and connected to said lever within this cover 52 is a rod 53 having a bearing 54 in the dust cover 52, and having a milled head 55 (see Fig. 1) and locking device 56. By movement of rod 53 the travelling speed of the machine is regulated. The pinion wheel 47 is slidably but non-rotatably mounted upon shaft 57 which is rotated by a train of gearing 58 housed in gear box 59 and driven by the electric motor 60 installed within the housing 30, fitting within the lug brackets 61 and secured by set screws 62. This motor 60 is further maintained in correct longitudinal position by means of a spring 63 affixed to the perforated cover 64 secured to the housing 30. The motor 60 has contained within its casing a fan 65 (shown in dotted lines, Fig. 2) affixed to the armature shaft, and the casing has orifices 66, so that the motor is kept cool by a current of air drawn in by the fan 65 through perforated cover 64, passed out through the orifices 66 into the housing 30 and thence through the perforated cover 31. The current of air is directed through the motor casing by a diaphragm 68. To the housing 30 is rigidly affixed the flanged cylindrical bearing bracket 70 but insulated therefrom by a diaphragm 71 which also acts as a dust protector. This bracket 70 contains a bearing 72 for the extension shaft 73 in alignment with and coupled to the shaft 57 but insulated therefrom by an insulated coupling, 74. The bracket 70 also forms a bearing for the rotatable flanged cylindrical sleeve 75 loosely secured to the bracket 70 by a flanged ring 76. About this sleeve 75 is a recessed ring band 77 which is adjustably secured to said sleeve 75 by the clamping screw 78. The ring band 77 carries bearings 79 for the tangent screw 80 passing through the threaded block 81 loosely held between cheeks 82 integral with a strap 83 which fits in the recess of the ring band 77, said strap being split at 84 and provided with a clamping screw 85 all for the purpose hereinafter set forth.

Affixed to the strap 83 but insulated therefrom by insulation 86 is a channelled bracket 87 containing a slotted bearing block 88 (see Fig. 20) in which slides the adjustable crank pin 89. This crank pin 89 is integral with a screw threaded disc 90 (see Fig. 7) screwed into a hollow head 91 integral with the shaft 40. The recess in the head 91 is formed eccentrically with the latter and the crank pin 89 is eccentrically set on the disc 90, so that said crank pin may be set concentrically with shaft 40 or to any required "throw" (see Fig. 21) and locked by a spring pin 92.

Rigidly secured to the sleeve 75 is the oscillating welding head 93.

On the end of shaft 73 is a worm 94 gearing with worm wheel 95 on cross shaft 96 which has bearings in the oscillating head 93, and carries a gear wheel 97 gearing with gear wheel 98 on a cross shaft 99 which carries a grooved and serrated feed roller 100 and a further gear wheel 101 meshing with gear pinion 102 on fixed shaft 103. The pinion 102 meshes with gear wheel 104 loosely mounted upon the shaft 105. Affixed to the shaft 105 is the tension arm 106 passing through the orifice 107 in top of the head 93 and having at its upper end an orifice 108 (see Fig. 6) through which passes the tension screw spindle 109. The tension screw spindle is anchored to bracket 110 and carries the tension spring 111, interchangeable sleeve 112, segmental bearing block 113, and tension nut 114. The interchangeable sleeve 112 has bearing in the dust cover 115 provided to protect the tensioning device. To the spindle 105 is affixed a radial arm 116 (see Figs. 10 and 11) on the outside of the head 93 and placed in juxtaposition to the tension arm 106. The radial arm 116 and the tension arm 106 provide bearings for a shaft 117 which at one end passes through arcuate slot 118 in the head 93. This shaft 117 carries the second serrated grooved roller 119 and also a gear wheel 120 gearing with the gear wheel 104.

Affixed to the housing 30 are brackets 121 supporting the drum 122 which carries the wire 123 constituting the electrode. The latter is fed from the drum through the orifice 124 of dust cover 115 and through orifice 107 down between the feed rollers 100 and 119 thence down the guide tube 125 and in rubbing contact with the latter. This guide tube 125 has near its bottom end a spherical seating 126 within the nozzle 127, so that the tube 125 may align itself with the electrode 123. Cup nut 128 on end of guide tube 125 prevents the latter from lifting.

The upper end 129 of the tube 125 is flared so as to allow of easy entrance of the electrode 123 and has a binding post 130. The nozzle 127 is fulcrumed on the pivot pins 131 (see Fig. 3) and passes through orifice 132 in the oscillating head 93. A deflector 133 is affixed on said nozzle and when the latter is not oscillated (as hereinafter explained) a conical dust cover 134 is rigidly attached to the oscillating head 93. Screwed on to the cup nut 128 is a nozzle mouth piece 135. When it is desired to oscillate the nozzle in the line of direction of the weld, the dust cover 134 must be removed, and oscillating means secured thereto. Said oscillating means (see Figs. 12 and 13) comprise an adjustable collar 136 secured to the nozzle and having threaded pintles 137 fitted with locking nuts 138, said pintles passing through slots 139 of a U-shape arm 140 which is knuckle jointed at 141 to a bell crank lever 142 contained within the housing 93 and protruding through an orifice 143 said lever being fulcrumed on pin 144 on a bracket 145 affixed in the head 93. The bell crank lever 142 is connected to the arm 146 of a strap 147 about the eccentric sheave 148. This sheave is loosely mounted upon the spindle 96 (before mentioned), and affixed to the cam 148 is the gear wheel 149 also loosely mounted on the spindle 96 and gearing with gear wheel 150 loosely mounted upon a fixed spindle 151 secured to the head 93.

Affixed to the gear wheel 150 is another gear wheel 152 gearing with gear wheel 97 keyed to the shaft 96. The eccentric sheave 148 imparts the required oscillation to the nozzle 127 and electrode 123 therein, the amount of oscillation being governed by the setting of the collar 136 on the nozzle and the slots 139 of arm 140 on the pintles 137.

To the head 93 are fitted side dust covers 152 and 153, the latter covering the radial arm 116 hereinbefore referred to and the ends of shafts 99 and 105.

In order to insure good electrical contact to feed roller 100, shaft 99 has on its end a tang or extension 154 which engages in a spring backed contact block 155 housed in a bracket 156 affixed to, but insulated from, the cover 153 and provided with a binding post 157 (see Fig. 9) to which is connected wire 235 (see Fig. 26). Said contact block 155 has a binding post 155' fixed to it, said post passing through a slot in the bracket 156 and being electrically connected to the said bracket by a wire 156'.

The head 93 has an end cover 159 hinged at 160 and locked by bolts 161. Attached to this cover 159 is a bracket 162 carrying on electro-magnet 163 having pole pieces 164 with extension pole pieces 165 adjustably affixed to pole pieces 164 by clamping screw bolt 166. The electromagnet 163 has binding posts 167 and 168.

On the cover 31 of the housing 30 and insulated therefrom are a plurality of metal resistance strips 170 over which is a perforated cover 171, said strips 170 being brought into series with the main electric welding circuit by the screw bolts 172 and binding posts 173 and 174 (see Fig. 2).

The air current induced by the motor fan 65 and expelled through the perforated cover 31 of housing 30, passes between and about the resistance strips 170 serving to keep them cool, and finally escapes through the perforated cover 171.

Provision is made on the cover 171 for the affixing of a bracket 175 for a guide wheel 32, (see Fig. 23).

Figure 1:
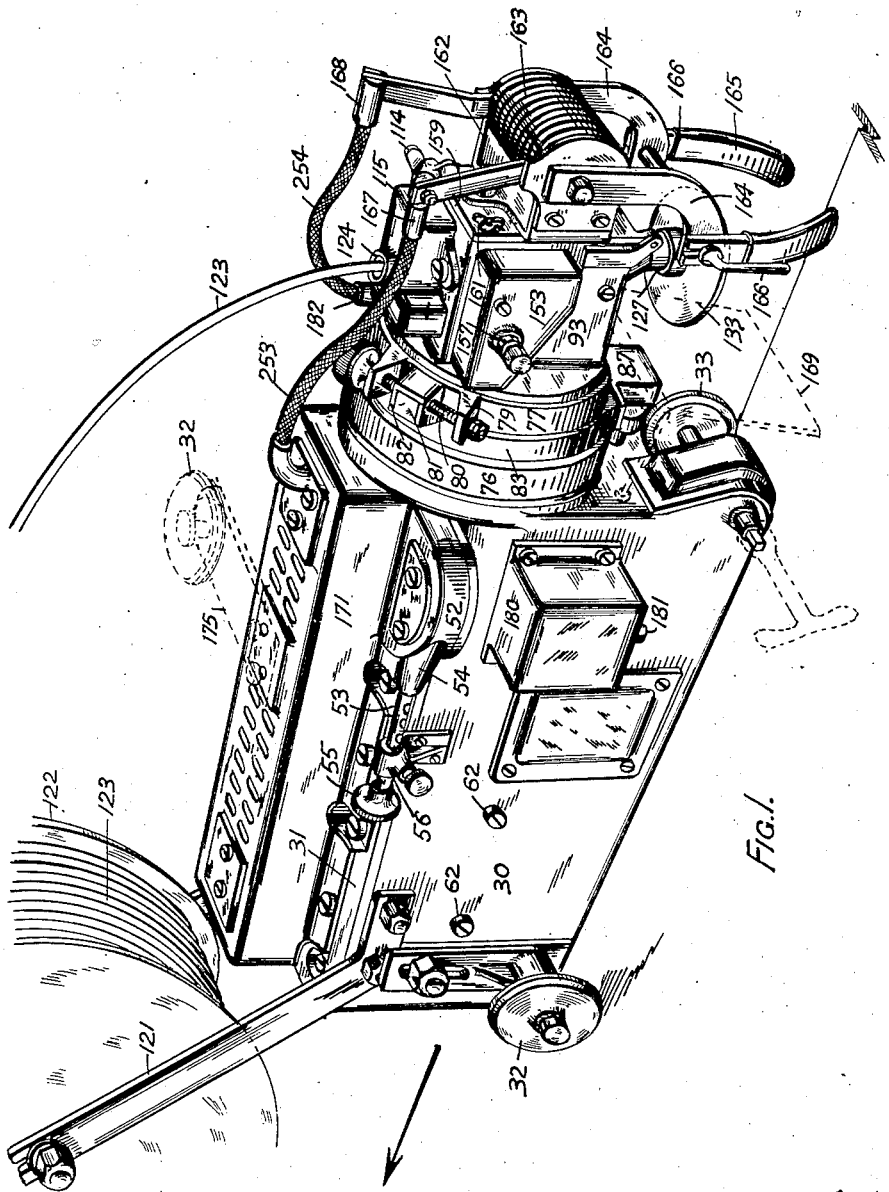

On the housing 30 and insulated therefrom are the binding posts 176, 177, 178 and 179 (see Fig. 5), also a switch box 180 having a push button 181, (see Fig. 1). On the oscillating head 93 is a socket 182 to receive a plug on the electric cable hereinafter referred to.

The machine during the welding process is driven along the joint to be welded, by the driving wheel 33 set in motion by the spur gear 34 and worm wheel 35, gearing wheels 37, 38 and 39, bevel gears 41 and 42, and a selected one of the concentric crown wheels 46 (according to the speed required) meshing with the pinion 47 on shaft 57, which shaft receives its motion through the set of gears 58 set in motion by the motor 60. As the machine is progressed along and in order to give an increased width to the crater burnt out and to the welding deposit to the joint, the crank pin 89 which receives motion from the bevel gears 41 and 42, oscillates the welding head 93 with its nozzle 127 and electrode 123 per medium of the sheave band 83.

The electrode 123 and nozzle 127 can also be oscillated in the line of direction of travel (the dust cover 134 being first removed) the U-shaped arm 140, bell crank 142, arm 146 and eccentric 148 which is set in motion by the gear wheels 97, 152, 150, and 149, shaft 96 (see Figs. 3 and 4) worm gear 94—95, driven shafts 73—57 and gearing 58 from motor 60; this lengthens the crater 184 (see Fig. 15).

In ordinary welding of iron or steel, (see Figs. 14, 16, 17 and 18) although the joints may be quite close the magnetic reluctance is much higher at the joint than in the adjacent material. This increased reluctance at the joint causes the magnetic lines of force 185 in the material, which are more or less concentric circles surrounding the crater 184 to spring out in arched form at the joint immediately beside the electrode 123 in the direction of travel. These lines of force are in such a direction as to cause the arc to be deflected in the opposite direction to the line of travel (see Fig. 16 in dotted lines). This results in the metal not being burnt out sufficiently beyond the electrode 123, (see Fig. 14) and the latter is liable to come into contact with the edge of the crater 184 thus causing a freeze on and consequently a stoppage. To overcome this difficulty, in this invention, an electromagnet 163 with adjustable pole pieces 165 is fitted which is capable of producing a field opposite in direction to the distorted magnetic lines referred to above and of such strength as to neutralize them. By adjustment of the said pole pieces 165 it is possible to more than neutralize the disturbing field and to produce one in such a direction as to cause the arc to be slightly deflected in the direction of travel, see Fig. 16.

It will be appreciated that the field produced by the welding current in the work would, if the metal of the work were unjointed, encircle the arc, the magnetic lines being concentric with the arc but, owing to the fact that behind the arc the joint has already been completed by the weld while in front of the arc there is an air gap between the abutting faces the abutting faces must be magnetized, one face forming the north and the other the south pole. The correcting field must therefore be of such a nature that it opposes the field due to the welding current at a point immediately in front of the arc and therefore de-magnetizes the abutting faces of the joint. The application of a magnetic field in this manner is entirely different from the use of a field to direct an electric arc towards any particular point, as for example, in known types of electric arc lamps. The correcting field in the present case must be transverse to the joint immediately in advance of the arc and this method of application and functioning therefore distinguish it completely from the known applications of a directing magnetic field to an electric arc.

In using a heavy welding current the depth of the crater formed is such that sometimes the electrode 123 is level or is even below the surface of the material being welded and, as pointed out above, due to the magnetic influences at work, the electrode would come in contact with the advancing edge of the crater and thus cause a stoppage.

By use of the device mentioned above this tendency has been entirely overcome.

We will now refer to Figs. 22 and 23 in which is shown how the machine is adapted for use in the welding of the longitudinal lap joints of pipes or other cylindrical objects. In Fig. 22 the welding head 93 is inclined so that the axial line of the nozzle and electrode practically bisect the angle between the edge of one plate and the surface of the other, and one or more of the wheels 32 is or are guided by said edge so that the machine is maintained in parallel relation thereto. To maintain the wheel or wheels 32 in the angle, the machine is set slightly out of the perpendicular, inclining towards the joint as shown. To angularly set the welding head the clamping screw 78 is slacked back and the head turned to approximately the required angle, the clamping screw is then screwed up and accurate adjustment made by manipulation of the tangent screw gear 80, as and when required.

In Fig. 23 is shown how a pipe joint is welded interiorly. In this case the machine has a guide wheel 32 mounted on a bracket 175 attached to the cover 171, so as to bear against the pipe, whilst, in this case also, the driving wheel 33 is guided by the inside lapping edge of the plate. The pipe is so arranged as to place the machine out of the perpendicular and thus ensure that the driving wheel 33 will remain in the groove whilst travelling along.

In Fig. 24 showing the application of the machine to the welding of abutting flat plates, a guide rail 187 is used, also a grooved guide wheel 32.

The electrode 123 passes down the guide tube 125 and said tube is connected by a flexible copper conductor 188 to the head 93 (see Fig. 7) and collects the current from the electrode—principally at the lower end of the tube. By this means the welding current does not traverse any great length of the electrode inside the head and consequently the resistance drop over a considerable length of heated electrode is not included in the armature circuit; thus almost true arc voltage is impressed on the armature. The armature circuit is made through the electrode 123, from the arc to the feed rollers 100 and 119; and the electrode 123 from the lower end of the guide tube 125 to the rollers, only carries the very small current required to drive the machine.

A shield 169 is loosely hung from the housing 93 so as to protect those parts of the machine behind the electrode from heat and any small particles which emanate from the arc during welding.

Referring to Fig. 26 which shows the electric equipment required in conjunction with the machine, the fixed panel denoted by dash lines 190 contains voltmeter 192, ammeter 193, adjustable resistance 194, contactor 195, slow-acting relay 196, two fuses 197 and 198 (5 amps and 15 amps respectively), and a current limiter 199. In addition there are the re-actance coil 200, rheostat 201 and a main switch 202.

The machine having been set to its particular work and correct adjustment of shunt 170 (resistance strips) made according to the strength of welding current required, the correct diameter of feed rollers 100 and 119 and the travelling speed (which is determined by the position of change speed lever 49) set for the particular work, the electrode 123 being correctly in position, that is, with its point set about one-eighth of an inch from the work 203, and the positive main lead 204 together with the small lead 205 having been connected to the work 203, the operation is as follows:—

The main switch 202 being closed and the rheostat 201 adjusted to give the welding current required, place a striking rod 206 firmly between the electrode 123 and work 203, then operate the push button 181 so that it engages with contact 207 and remains in such position for a short period of time, say 3 seconds, so that a circuit is completed from negative lead 208, through switch 202 contact 209 wire 210, terminal 211, 5 amp fuse 197, wire 212, terminal 213, wire 214, terminal 176, wire 215, contact 207 push button 181, terminal 177, wire 216 terminal 217, wire 218 coil 219 of current limiter 199, wires 220 and 221 resistance 222 of current limiter 199, wire 223, 15 amp fuse 198, wire 224 terminal 225, wire 205, to work 203 and positive lead 204. This results in the closure of the contacts 227 of current limiter 199, thus completing the following circuit from negative lead 208 switch 202 contact 209, wire 210 terminal 211, 5 amp fuse 197, wire 212, terminal 213 wire 214, terminal 176 wire 215, contact 207 push button 181, terminal 177 wire 216 terminal 217, wires 218 and 228, contacts 227 wire 229, coil of slow-acting relay 196, wire 230, terminal 231, wire 232, terminal 179, wire 233, 25 amp fuse 234, wire 235, contact 157 to the feed rollers 100 and 119, electrode 123 striking rod 206 inserted between electrode and work 203 to positive lead 204. This energizes the slow action relay 196 causing the armature 236 to make contact with the contact point 237 thereby completing another circuit as follows:

From negative lead 208 to 5 amp fuse 197 (as before described) thence by wire 238, resistance 194, wire 239, coil of contactor 195, wire 240, contact 237 and armature 236, wire 241, 15 amp fuse 198, wire 224 terminal 225, wire 205, to work 203, and positive lead 204.

This circuit energizes the contactor 195 and causes the armature 242 to make contact with contact point 243, which completes the main welding circuit through rheostat 201, reactance coil 200, wire 244, terminal 245, wire 246, coil 247 of current limiter 199, ammeter 193, wire 248, armature 242 contact point 243, wire 249, terminal 250, wire 251, terminal 252, terminal 174 of shunt (resistance strips) 170, terminal 173, wire 253, through magnetic coil 163 (if used) plug head 93 (represented by dot), wire 188 to binding post 130 on guide tube 125, electrode 123, striking rod 206, to work 203 to positive lead 204. The push button 181 is now released closing contacts 254 and 255 and at the same time the striking rod is withdrawn thus creating an arc between the electrode 123 and the work 203. Releasing the push button de-energizes the coil 219 of the current limiter 199 on account of circuit being interrupted at contact point 207; but contacts 227 are held closed by virtue of the coil 247 being in the main welding circuit.

The motor 60 will now revolve and maintain the arc practically constant, the motor field being excited from the main current shunt and its armature having arc voltage impressed upon it; the armature circuit is completed as follows:—from electrode 123 to feed rollers 100 and 119 wire 235, (connected to binding post 157) 25 amp fuse 234, armature of motor 60, wire 256, contact 255, push button 181, contact 254, terminal 178, wire 257, terminal 258, wire 221, current limiter 199, contact 259, wires 260 and 223, 15 amp fuse 198, wire 224, terminal 225, wire 205 to work 203 and positive lead 204.

The slow acting relay 196 still maintains its armature 236 in contact with contact 237, as arc voltage is impressed upon its winding, this circuit being as follows: electrode 123 feed rollers 100 and 119, 25 amp fuse 234, wire 233, terminal 179, wire 232, terminal 231, wire 230, coil of relay 196, wire 229, upper contacts 227 of current limiter 199, wires 228 and 218, terminal 217, wire 216, terminal 177, push button 181, contact 254, terminal 178, wire 257, terminal 258, wire 221 current limiter 199, contact 259, wires 260 and 223, 15 amp fuse 198, wire 224, terminal 225, wire 205, to work 203 and positive lead 204. Although a slow acting relay 196 is shown, an ordinary relay with a dash pot may be used. A slow acting relay is necessary so as to delay the armature 236 in breaking contact with contact point 237, and consequently de-energizing the contactor relay 195 during the short interval of time that the relay coil circuit is interrupted whilst push button 181 is released from starting position to normal.

The motor will maintain a constant length of arc, within narrow limits, since the armature is connected in shunt with the arc and the field in shunt with the main current shunt. The motor being connected in this manner, should the arc lengthen, an increased voltage results at this point, causing a reduction in the welding current. This increased voltage being applied to the armature in conjunction with a weakened field, caused by the reduced welding current, causes the motor to be accelerated whilst the reverse occurs if the arc shortens. Should the fusing rate of the electrode wire increase, the motor speed will likewise increase and so cause a faster rate of feed of the electrode, and this will also give an increased rate of travelling speed of the machine along the work, and thus produce a weld having a uniform quantity of metal deposited along the weld. The converse of the above occurs if the fusing rate of the electrode wire decreases.

Should any abnormal condition cause the arc to be ruptured or the electrode wire to "freeze on" to the work, the control gear will automatically cut off all current to the machine. For instance: should the arc rupture, the current limiter 199 will be de-energized and is contacts 227 and 259 opened, thus de-energizing the slow acting relay coil 196, which will in turn cause its contact 237 to disengage from armature 236 and de-energize the contactor coil 195 and so allow its contact 247 to disengage from armature 242. Again, should a "freeze on" occur, the relay coil 196 will be de-energized due to loss of arc voltage, and this will again result in the contactor 195 opening the main current circuit.

The variable resistance in series with the contactor coil is inserted to allow of the apparatus being used on circuits of considerably different voltages.

The current limiter is provided to protect the armature of the motor against heavy rushes of current, which would be set up by line voltage being impressed on the armature terminals, as would be the case, if the arc ruptured.

If it is desired to stop the machine this may be done in two ways:—first by operating the push-button 181 to off-normal position so that it makes no contact whatever and thus breaks the armature circuit, which will de-energize the relays 196 and 195 causing their respective armatures 236 and 242 to break contact with the contact points 237 and 243 respectively, or secondly by inserting the striking rod 206 between the electrode 123 and the work 203, which destroys the arc voltage thus de-energizing the relays.

In order to cut out the electromagnet 163 the lead 254 is removed from plug orifice 182 and the lead 253 disconnected from terminal 167 and plugged into orifice 182.

What we claim and desire to secure by Letters Patent is:—

1. In an electric arc welding machine constructed to automatically travel along the joint to be welded and including an electric motor geared to a driving wheel, a pair of feed rollers also geared to said motor, and an electrode passing between said feed rollers, means whereby the motor speed is automatically varied in accordance with any variation occurring in the length of the arc, so that the progressive speed of the machine and rate of feed of the electrode are synchronized, said means comprising a connection whereby the arc voltage is impressed on the motor armature, and an adjustable shunt in the welding circuit whereby a proportion of the welding current is passed through the motor field, the strength of the latter being thus varied proportionately to the value of the current in the welding circuit.

2. An electric arc welding machine constructed to automatically travel along the joint to be welded, and comprising, in combination, a housing supported on wheels one at least of which constitutes a driving wheel, an electric motor within said housing, gearing between said motor and driving wheel, a welding head rotatably mounted on said housing, a pair of feed rollers mounted in said head to grip between them a wire electrode passing through said head, gearing between said feed rollers and said motor, and electric connections whereby the voltage of the welding arc between said electrode and the work is impressed upon said motor to vary the speed of same and consequent rate of feed of the electrode and rate of travel of the machine directly to the variation in the arc voltage.

3. In an electric arc welding machine as in claim 1 adjustable change speed gear between the said motor and the said driving wheel, whereby the rate of progression of the machine relatively to the rotative speed of the motor may be regulated.

4. In an electric arc welding machine including a mounted welding head, electrode feeding mechanism in the said head, a housing on which said head is mounted in an angularly adjustable manner, an electric motor within said housing, a motor driven worm spindle co-axial with the said head and worm gear in the head leading from the said worm spindle to the electrode feeding mechanism, whereby the head is free to move angularly without materially changing the rate of feed.

5. In an electric arc welding machine, in combination, a housing containing an electric motor, a welding head rotatably mounted on said housing, means within the said head for feeding the welding electrode under the control of the motor, clamping means whereby said head may be quickly set to a desired angular position in relation to said housing, and in addition tangent screw mechanism for finely adjusting laterally the point of the electrode in relation to the line of the joint to be welded.

6. In an electric arc welding machine comprising in combination, a welding head, in said head a pair of feed rollers formed to grip between them an electrode, and an electric motor geared to said feed rollers, a nozzle pivotally attached to said head and guiding said electrode and adjustable means whereby said nozzle is oscillated in a plane parallel with the joint to be welded, such oscillation being superposed upon the normal travel of the electrode along the work.

7. In an electric arc welding machine employing a metal electrode, means for demagnetizing the abutting and unwelded faces of the joint to be welded immediately in advance of the point of fusion, which faces are magnetized by the field produced by the welding current.

8. In an electric arc welding machine employing a metal electrode, means for producing a correcting magnetic field a little in advance of the point of fusion, which magnetic field is directed transversely across the unwelded portion of the joint in a direction opposed to the field produced by the welding current and therefore acting to demagnetize the abutting faces of the joint in advance of the point of fusion.

9. In an electric arc welding machine employing a metal electrode, a magnet having pole pieces located on either side and slightly in advance of the electrode tip, the magnetic field produced at the front of the arc by the said pole pieces acting in a direction opposed to the field produced in advance of the point of fusion by the welding current and therefore acting to demagnetize the abutting faces of the joint.

10. In an electric arc welding machine as in claim 9, means for adjusting the position of said pole pieces so as to vary the strength of the flux produced by them through the abutting and unwelded faces of the joint immediately in advance of the point of fusion.

11. In an electric arc welding machine employing a metal electrode, an electromagnet having pole pieces adjacent to the arc and adapted to produce a magnetic field through the abutting and unwelded faces of the joint immediately in advance of the point of fusion and opposite in direction to the field at this point produced by the welding current, and means whereby the current supplied to the electromagnet can be varied according to the strength of the correcting magnetic field required.

12. In an electric arc welding machine employing a metal electrode, an electromagnet having pole pieces adjacent to the arc, a magnet exciting coil in series in the welding circuit, the said electromagnet being adapted to produce a correcting transverse magnetic field across the abutting and unwelded faces of the joint immediately in advance of the point of fusion and opposite in direction to the field at this point produced by the welding current.

13. In an electric arc welding machine, employing a metal electrode, a housing, a wheel supporting said housing to enable it to travel along a joint to be welded, an electric motor within said housing, gearing between said motor and one of said wheels so that the latter serves as a driving wheel, a welding head mounted on the forward end of the said housing, electrode feeding rollers within said welding head, gearing between the feed rollers and the said motor within the housing, a welding circuit for the supply of current to the electrode, a resistance interposed in the welding circuit, connections from the motor field across a portion of said resistance whereby a proportion of the welding current is caused to pass through the motor field, and electrical connections to the motor armature whereby the armature is connected across the welding arc.

14. In an electric arc welding machine including a pair of geared feed rollers to grip and feed the electrode, roller mounting means permitting interchange of pairs of rollers of different diameter, said means comprising a shaft carrying one roller, a second shaft carrying the other roller and mounted in adjustable spaced parallel relation to the first mentioned shaft, planetary gearing between said shafts, and means for adjustably maintaining the second shaft in desired spaced parallel relation to the first shaft.

15. In an electric arc welding machine comprising a housing supported on wheels, a driving motor therein, a head rotatable in relation to said housing, and feed rollers mounted in said head to grip and feed the electrode, a transmission shaft geared to said motor and to said feed rollers and constituting the axis upon which said head is rotatable.

16. In an electric welding machine in which the electrode is fed through a nozzle, a current collecting tube within said nozzle and with which said electrode makes sliding contact, said tube being mounted to oscillate within the nozzle and maintain axial alignment with the electrode.

Signed at Sydney, N. S. W., this twenty-second day of May A. D. 1923.

ARTHUR EDWARD CUTLER.
PHILIP ALLAN MARSDEN.